United States Patent
Aufenast

(10) Patent No.: US 12,246,481 B2
(45) Date of Patent: Mar. 11, 2025

(54) MOULD CONFIGURATION

(71) Applicant: WHAT THE FUTURE B.V., Amsterdam (NL)

(72) Inventor: Edmund David Aufenast, Amsterdam (NL)

(73) Assignee: What the Future B.V., Amsterdam (NL)

( * ) Notice: Subject to any disclaimer, the term of this patent is extended or adjusted under 35 U.S.C. 154(b) by 629 days.

(21) Appl. No.: 17/414,079

(22) PCT Filed: Dec. 19, 2019

(86) PCT No.: PCT/EP2019/086423
§ 371 (c)(1),
(2) Date: Jun. 15, 2021

(87) PCT Pub. No.: WO2020/127807
PCT Pub. Date: Jun. 25, 2020

(65) Prior Publication Data
US 2022/0097289 A1    Mar. 31, 2022

(30) Foreign Application Priority Data

Dec. 20, 2018  (NL) ..................................... 2022253
Jan. 23, 2019  (NL) ..................................... 2022437

(51) Int. Cl.
*B29C 51/42* (2006.01)
*B29C 51/30* (2006.01)
*B33Y 80/00* (2015.01)

(52) U.S. Cl.
CPC ............ *B29C 51/428* (2013.01); *B29C 51/30* (2013.01); *B33Y 80/00* (2014.12)

(58) Field of Classification Search
CPC ............................... B29C 51/20; B29C 51/428
See application file for complete search history.

(56) References Cited

U.S. PATENT DOCUMENTS 1,553,560 A * 9/1925 Schaefer ................ B29D 22/00
                                                                 425/235
3,019,488 A    2/1962 Doyle et al.
(Continued)

FOREIGN PATENT DOCUMENTS

CN        106346760 A    1/2017
CZ            31679 U1    4/2018
(Continued)

OTHER PUBLICATIONS

Machine translation of CZ 31679, retrieved Feb. 8, 2024 (Year: 2024).*

(Continued)

*Primary Examiner* — Timothy Kennedy
(74) *Attorney, Agent, or Firm* — Perilla Knox & Hildebrandt LLP

(57) ABSTRACT

The invention is directed to a mould configuration (1) suited for use in a thermoforming forming station arranged to form one or more objects comprising a mould (2) made from a polymer material by additive manufacturing and provided a mould volume (6) consisting of a recess (6a) corresponding with the shape of the object as an upper zone (6b). A lower zone is divided from the upper zone by a recess wall (8). The lower zone (7) is provided with one or more open spaces (9) which fluidly connect the lower surface (8a) of the recess wall (8) with one or more openings (10) in the bottom (5) of the mould (2), a heat exchanger module (11) facing the bottom (5) of the mould (2) comprising cooling means (12) and cooling medium displacement means (13) and cooling medium inlet openings (14) and cooling medium outlet openings (15).

8 Claims, 4 Drawing Sheets

(56) References Cited

U.S. PATENT DOCUMENTS

| | | | | |
|---|---|---|---|---|
| 3,474,497 | A * | 10/1969 | Ridley, Jr. | B29C 51/36 425/149 |
| 3,496,607 | A * | 2/1970 | Larson | B29C 51/04 249/102 |
| 3,712,780 | A * | 1/1973 | Jope | B26F 1/44 264/153 |
| 3,871,611 | A * | 3/1975 | Taketa | B29C 33/306 249/102 |
| 3,880,563 | A | 4/1975 | DeVos | |
| 3,960,471 | A * | 6/1976 | Medendorp | B29C 51/34 264/553 |
| 4,139,586 | A * | 2/1979 | Gasson | B29C 51/10 264/522 |
| 4,416,604 | A * | 11/1983 | Bender | B29C 45/2673 425/572 |
| 4,551,084 | A * | 11/1985 | Lake | B29C 33/308 249/102 |
| 4,805,869 | A * | 2/1989 | Saunders | B65H 35/0026 249/102 |
| 5,017,125 | A * | 5/1991 | Finnah | B29C 51/165 425/510 |
| 5,751,481 | A * | 5/1998 | Dalzell | G02B 5/30 264/1.32 |
| 7,204,685 | B1 * | 4/2007 | Crain | B29C 45/2675 425/185 |
| 9,370,883 | B2 * | 6/2016 | Boinard | B29C 43/203 |
| 2002/0090409 | A1 * | 7/2002 | Seger | B29C 33/305 249/102 |
| 2010/0023155 | A1 * | 1/2010 | Conrad | B29C 33/3842 700/118 |
| 2011/0232856 | A1 | 9/2011 | James | |
| 2012/0289387 | A1 | 11/2012 | Ehrmann | |
| 2018/0085972 | A1 | 3/2018 | Kyttanen et al. | |

FOREIGN PATENT DOCUMENTS

| | | | |
|---|---|---|---|
| EP | 997258 A2 * | 5/2000 | B29C 51/262 |
| EP | 1452296 A1 * | 9/2004 | B29C 33/306 |
| FR | 2697199 A1 * | 4/1994 | B29C 51/167 |
| JP | S61104821 | 5/1986 | |
| WO | 2017125488 A1 | 7/2017 | |

OTHER PUBLICATIONS

International Search Report and Written Opinion for PCT/EP2019/086423; Mar. 10, 2020; 30 pgs.

Written Opinion of the International Preliminary Examining Authority for PCT/EP2019/086423; Nov. 11, 2020; 8 pgs.

* cited by examiner

MOULD CONFIGURATION

The invention is directed to a mould configuration made from a polymer material by additive manufacturing and suited for use in a 'thermoforming forming station arranged to form one or more objects.

US2012/0289387 describes mould suited for use in a 'thermoforming forming station arranged to form one or more objects. The mould can be easily removed from a thermoforming forming station and replaced by another mould. The mould is cooled by means of a cooled support plate for the mould. This support plate is not replaced when the mould is replaced.

WO2017/125488 describes a mould station provided with a mould, wherein the mould is made of a polymer and manufactured by means of additive manufacturing. The thermoformed product which can be made in the mould are containers for a frozen confection. When forming a moulded container in the polymer mould a warm flexible polymer sheet is drawn into the mould. In the mould the sheet cools down and hardens. The hardened container can then be removed from the mould and a next moulded container can be made in the mould. Moulds made by additive manufacturing may be for example made by a polymer material having a low heat conductivity and a glass transition temperature which is lower than the temperature of the warm flexible sheet which is drawn into the mould.

A problem with the polymer mould as described in WO2017/125488 is that at the operating temperatures the sheet and mould may bond to each other. This may cause mechanical stress on the moulds. Because the moulds are manufactured by additive manufacturing such additional stress may more easily cause mechanical damage to the moulds and thus lowering the mould life. Known moulds made of for example metal or ceramic materials do not have this disadvantage. The object of the present invention is to provide for an apparatus and method which allow the use of polymer moulds in combination with a high mould life. This object is achieved by the following mould configuration.

Mould configuration suited for use in a thermoforming forming station arranged to form one or more objects comprising a mould made from a polymer material by additive manufacturing and provided with an upper end, side walls and a bottom which is spaced apart from the upper end defining a mould volume, wherein the mould volume consists of a recess corresponding with the shape of the object as an upper zone, a lower zone which extends below the upper zone and divided from the upper zone by a recess wall, wherein the lower zone is provided with one or more open spaces which fluidly connect the lower surface of the recess wall with one or more openings in the bottom of the mould, and a heat exchanger module facing the bottom of the mould comprising cooling means and cooling medium displacement means and cooling medium inlet openings and cooling medium outlet openings, wherein the cooling medium inlet openings and the cooling medium outlet openings are in fluid communication with the one or more openings in the bottom of the mould.

Applicants found that by having a heat exchange module and effective cooling of the polymer mould is achievable which allows the thermoforming station to produce the moulded objects at a higher rate in combination with a high mould life. Further advantages will be described when describing the preferred embodiments below.

In the description terms like bottom, top, upper, lower, horizontal, vertical, above and below refer to the preferred position of the mould configuration in a thermoforming forming station wherein a horizontal sheet is subjected to thermoforming. These terms used to describe the mould configuration more clearly and are not intended to limit the invention to only a mould configuration in this position. It may for example also be conceived that this mould configuration is such that a vertical oriented sheet is subjected to thermoforming. Also two opposite positioned moulds according to the invention may be used as in blow moulding. In such a configuration the upper mould will have a lower zone above an upper zone.

The mould configuration is suited for use in a thermoforming forming station arranged to form one or more objects. Thermoforming stations are well known and are usually part of a thermoforming packaging machines which also includes a filling station, a sealing station and a cutting station. Examples of suitable thermoforming packaging machines are those obtainable from Multivac Sepp Haggenmuller GmbH in Wolfertschwende, DE and for example described in the afore mentioned US2012/0289387.

The open spaces, the openings in the bottom of the mould, the cooling medium inlet openings and cooling medium outlet openings of the heat exchange module, the cooling means and the cooling medium displacement means are suitably part of one or more cooling medium flow paths for an cooling medium flow wherein, in use, the cooling medium flow cools the lower surface of the recess wall. In this manner the cooling medium may be reused when it follows the cooling medium flow path. The cooling medium will be reduced in temperature by the cooling means. The cooled cooling medium will flow to the open spaces via the openings in the bottom of the mould to the lower surface of the recess wall. Here the cooling medium will cool or at least maintain the temperature of the recess wall to a desired low temperature. The used cooling medium which will be increased in temperature will be cooled for a next use in the cooling means. The cooling medium displacement means which force the cooling medium along this cooling medium flow path may be positioned up stream or down stream of the cooling means within the heat exchange module. The cooling medium inlet and cooling medium outlet openings may be separate openings or may even be the same opening where cooling medium flows in one direction at one side and in an opposite direction at an opposite side of the same opening.

The cooling means may be any cooling means suited to cool a flow of air. Preferably the cooling means cool the cooling medium by means of indirect heat exchange against a colder surface. This surface preferably has a large heat exchange area. The surface is preferably metal. A preferred cooling means are metal fins. These metal fins are present in the one or more cooling medium flow paths. In this way the cooling medium will be optimally cooled. The fins may themselves be cooled by letting a colder liquid or air medium flow within the fins. The fins may be connected to a Peltier effect cooling unit, preferably in combination with a temperature control loop involving a temperature sensor and a controller. Preferably the fins are directly connected to a metal surface. In such a direct connection the fins are reduced in temperature by thermal conduction between the relatively warmer metal fins and the metal surface which has a lower temperature. The metal surface itself may be part of the bottom of the mould configuration. The bottom of the mould configuration may in turn be reduced in temperature by thermal conductivity between said bottom and a cooled support plate of a thermoforming forming station as for example described in the aforementioned US2012/0289387.

The cooling medium may be a liquid cooling medium. Suitable liquid cooling medium are ethylene glycol, propylene glycol, aryl ethers or glycerol optionally combined with water. Preferably the cooling medium is water optionally comprising a corrosion inhibiting agent. More preferably the cooling medium is a gaseous cooling medium, suitably air or nitrogen, of which air is preferred.

The cooling medium displacement means are suitably liquid medium displacement means, preferably pumps when the cooling medium is liquid. The cooling medium displacement means are suitably gas displacement means when the cooling medium is a gas and more specifically air displacement means when the cooling medium is air. The gas or the preferred air displacement means may be any suitable means to displace a gas or air within the mould configuration. Examples are ventilators, preferably centrifugal fans and tangential fans. The ventilators are suitably powered by an external electrical source.

The heat exchange module may be comprised of a set of rows of cooling means and cooling medium displacement means thereby creating more than one cooling medium path ways between heat exchange module and the open space of a mould or the open spaces of more than one mould. Preferably the heat exchange module comprises a set of rows consisting of a row of more than one cooling medium displacement means and a row of metal fins positioned parallel to and adjacent to the row of cooling medium displacement means. More preferably the heat exchange module comprises multiple of such sets positioned parallel to and adjacent to a next set. Even more preferably 2, 3 or 4 of such sets are present. When the cooling medium displacement means are centrifugal fans it is preferred that they have an cooling medium outlet directed upwards towards a row of cooling medium outlet openings of the heat exchange module.

The mould configuration is especially beneficial when a mould is used having a low heat conductivity such as the polymer mould according to this invention. Such a mould may not be cooled efficiently by the prior art thermoforming packaging machines. For example the machine in US2012/0289387 describes a cooled support place for the mould. This would be sufficient for most types of metal moulds. But if a mould having a lower heat conductivity is used such a cooling arrangement is not sufficient. Thus the invention is especially directed to a mould having a thermal conductivity of the material which is at least 10 times and more especially 50 times lower than the thermal conductivity of the metal fins described above.

The mould configuration is especially beneficial when a mould is used to form a polymer sheet when the mould is made of a polymer having a glass transition temperature which is lower than the operating temperature of the thermoforming forming station and wherein the melting temperature of the polymer is higher than the operating temperature of the thermoforming forming station. The operating temperature of the thermoforming forming station is hereby defined as the temperature of a polymer sheet as it is drawn into the polymer mould. The temperature of the polymer sheet is suitably a temperature between the glass transition temperature of the sheet and the melting temperature of the sheet. Thus suitably the mould configuration is suited to operate at an operating temperature which is between the glass transition temperature of the polymer mould and the melting temperature of the polymer mould and wherein the operating temperature is also between the glass transition temperature of the sheet and the melting temperature of the sheet. Examples of possible polymers suited for the polymer mould are acrylonitrile butadiene styrene (ABS), polylactic acid (PLA), Polyethylene terephthalate glycol (PETG) and Nylon. Examples of possible polymers suited for the polymer sheet are Polyethylene terephthalate (PET), polypropylene (PP), polyethylene (PE), polyvinyl chloride (PVC), high impact polystyrene (HIPS) and acrylonitrile butadiene styrene (ABS).

The mould is obtained by 3D printing Preferably the recess wall of the mould is obtained by of additive manufacturing, also referred to as 3D printing, because this enables one to manufacture different designs without having to machine every single different mould. More preferably the upper end, side walls and bottom provided with the openings of the mould are manufactured by additive manufacturing resulting in a lower zone provided with the open spaces.

A number of 3-D printing technologies will be available to the skilled addressee, printing in a range of materials including plaster (e.g. FDM 3D printers made by Ultimaker, SLS Printers, for example the ProX SLS 6100 made by 3D Systems and MJF Printers made by HP thermoplastics, photopolymerised polymers, or thermally-sintered materials, such as thermoplastic powders. Specific examples of suitable materials and additive manufacturing techniques are ABS Plastic manufactured using Fused Deposition Modelling FDM, Selectively Laser Sintered SLS Nylon and Selectively Laser Sintered SLS Alumide®.

The thickness of the recess surface is preferably between 0.5 and 5 mm. In this surface openings fluidly connecting the upper end of the mould configuration and the open space of the mould may be present. Such holes suitably are less than 2 mm in diameter, and preferably less than 1 mm in diameter. The openings allow air to escape through the mould during the forming process while the cooling medium substantially remains within the heat exchange module. Apart from these openings it is preferred that the one or more spaces as present in the lower zone of the mould is air tight sealed from the upper zone. In case the cooling medium is a liquid or a gas which is different from air a drain for the air to escape is suitably present. This drain is suitably not in fluid communication with the with the open spaces of the lower zone. This drain may be channels specially printed in the recess surface fluidly connected to the openings and directing the escape air to the side of the exterior of the mould or the container as described below.

The mould is positioned above the heat exchange module. Several moulds having the same or different shaped recesses may be positioned above one heat exchange module. Preferably the mould or moulds are positioned above the heat exchange module within a single container. Such a container may have a metal bottom, side walls and an open upper end such that the recess of the mould is accessible from above. The metal bottom of the container is suitably connected to the metal fins of the cooling means, wherein the earlier referred to cooled surface to which the fins are connected is part of the bottom of the container.

Preferably the mould is removably fixed in the container. This allows multiple combinations of different moulds having different shaped recesses with the same heat exchange module in the container. The removably fixed mould is suitably placed in a mould holder suited to hold the one or more moulds and wherein the mould holder and the one or more moulds are positioned on top of the heat exchange module within the container thereby fixating the moulds relative to the heat exchange module. Fixation of the moulds avoids that the moulds are lifted from the mould configuration by the moulded film which may temporarily adhere to the upper surface of the recess wall of the mould in the thermoforming process.

Suitably the container comprising the heat exchange module is designed such that it can be positioned on a cooled support plate of a thermoforming forming station as for example described in the aforementioned US2012/0289387. In use, the metal bottom of the container is reduced in temperature. By thermal conduction the metal surface and the connected metal fins may then be cooled.

Suitably the thermoforming forming station and the container are part of a modular configuration allowing the container to be replaced by a different container according to this invention.

One heat exchange module may be fluidly connected to the lower end of more than one moulds. These moulds may be the same or have a different shape.

The mould configuration may be used in a thermoforming forming station wherein a horizontally oriented sheet is drawn into the mould from above. Such a moulded product may be used for food packaging. A planar sheet may be sealed on top of such a moulded product after a food product has been added to the moulded product. The mould configuration may also be oriented such that a vertical oriented sheet is sideways dawn into the mould. It is also possible to use two mould configurations, which may be oriented as described before, suited to make the same of different shaped parts of a moulded product. These parts can then be sealed or welded together to form a shaped product. Such a shaped product may be used for packaging food. The food may for example be added to such a combined product through an opening which may be closed after adding the food product.

The invention will be illustrated by making use of the following non-limiting FIGS. 1-6.

Figure 1:
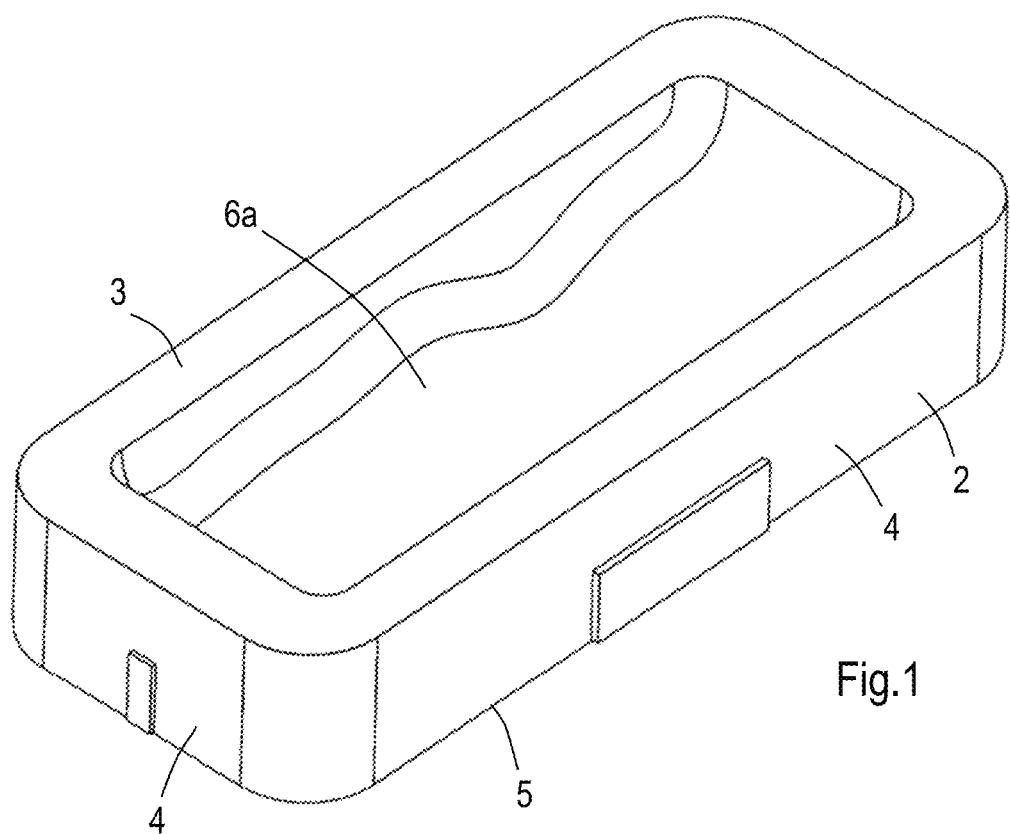
FIG. 1 shows a mould (2) provided with an upper end (3), side walls (4) and a bottom (5) which is spaced apart from the upper end (3) defining a mould volume (6), wherein the mould volume (6) consists of a recess (6a) corresponding with the shape of the object as an upper zone (6b).
Figure 2:
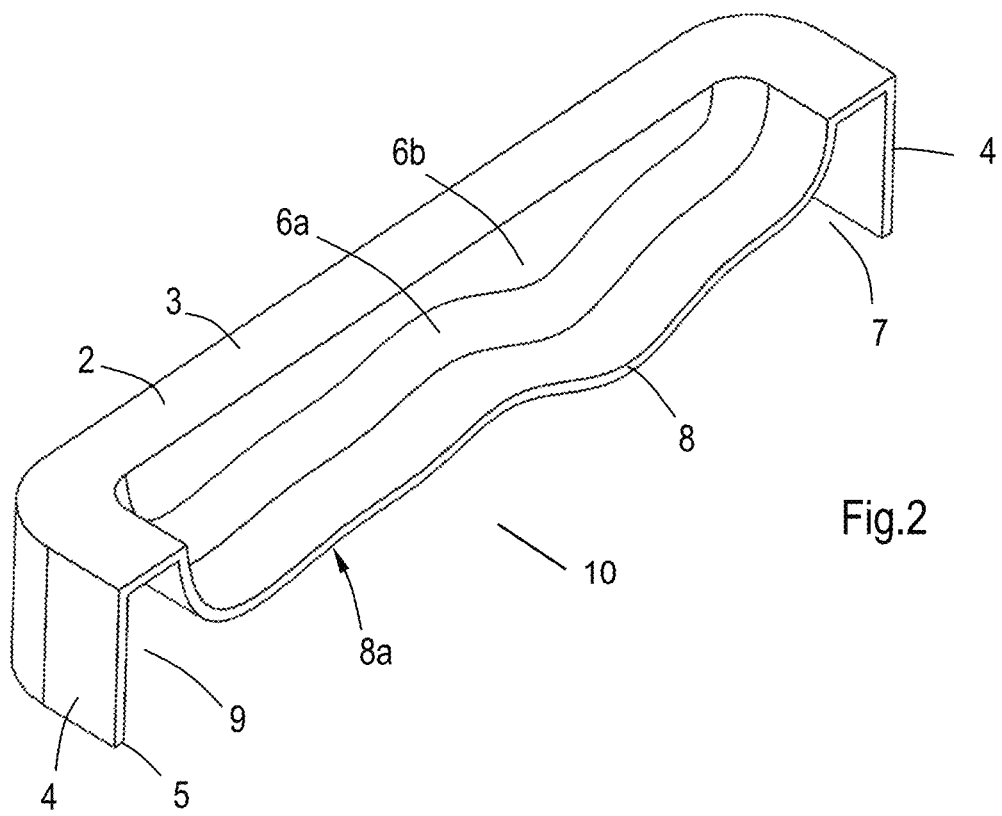
FIG. 2 shows a cross-section of the mould (2) of FIG. 1. A lower zone (7) which extends below the upper zone (6b) is divided from the upper zone (6b) by a recess wall (8), wherein the lower zone (7) is provided with one or more open spaces (9) which fluidly connect the lower surface (8a) of the recess wall (8) with one large single opening (10) in the bottom (5) of the mould (2).
Figure 3:
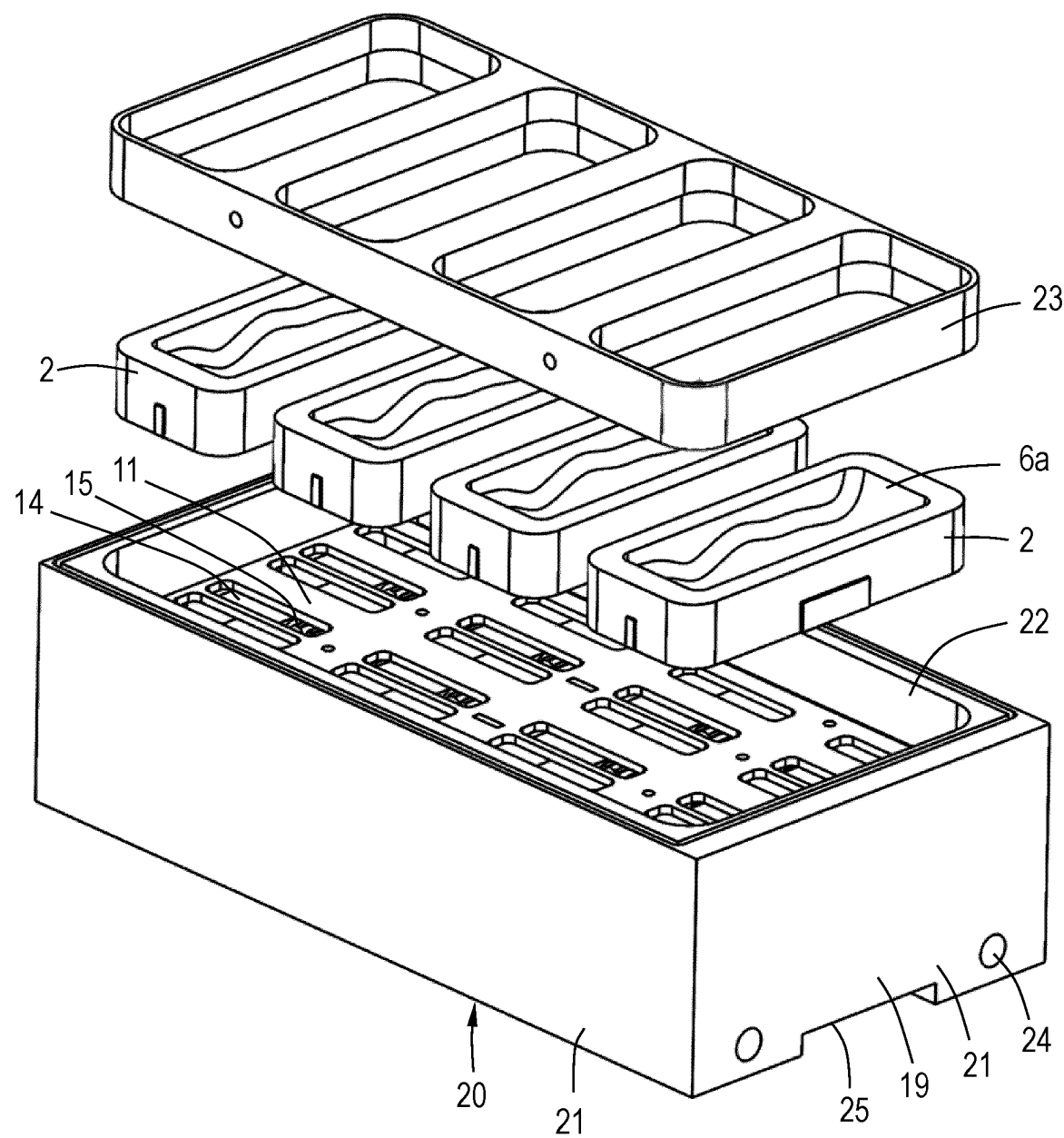

FIG. 3 shows an exploded view of how four moulds (2) of FIGS. 1-2 are combined with a heat exchange module (11) in a single container (19). The container has a metal bottom (20), side walls (21) and an open upper end (22) such that the recess (6a) of the mould (2) is accessible from above. The four moulds (2) fit into a mould holder (23) from below. By fixing the mould holder (23) by screws to container (19) the moulds are mixed. By simple unfixing the mould holder (23) the moulds (2) may be replaced by other moulds (2).

When the mould holder (23) with the moulds (2) are positioned in the container the single openings (10) of all four moulds (2) are in open fluid communication with the air inlet (14) and air outlet (15) openings as present at the upper side of the heat exchange module (11) using air as the cooling medium. When assembled the space below the moulds (2) is gas tight separated from the space above the moulds. The recess wall (8) may be provided with small openings (not shown) to allow air to escape when the moulded sheet product is made. moulds themselves. Also shown are openings (24) to which a vacuum pump may be attached or a one way valve such that excess air can momentarily escape during the thermoforming process. Indentation (25) in the bottom (20) of the container (19) fits on a rail (26) of a cooled support plate (27) of a thermoforming forming station as shown in FIG. 6.

Figure 4:
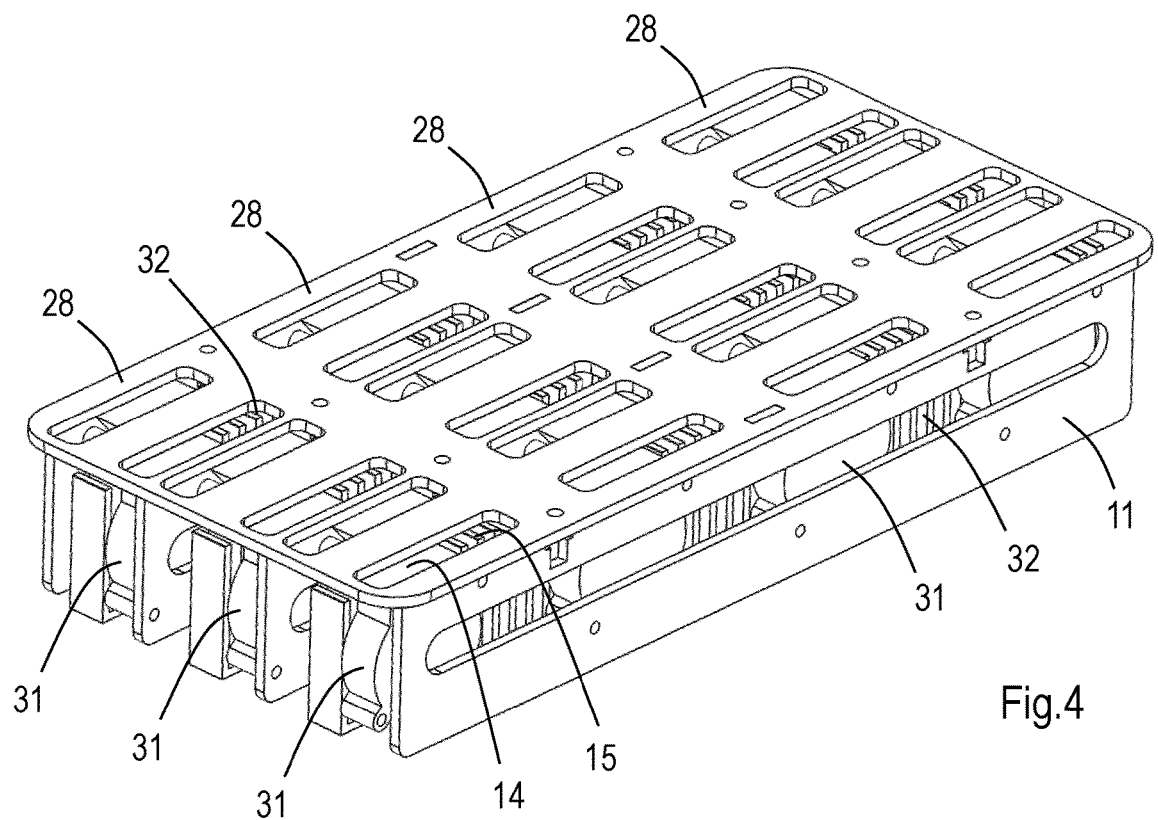

FIG. 4 shows a heat exchanger module (11) using air as the cooling medium and provided with four sets (28) of centrifugal fans (31) as air displacement means (13) and metal fins (32) positioned below each mould (2). Per mould six centrifugal fans (31) are present. The air flows through openings (14) to the centrifugal fans (31) along the metal fins (32) and upwards to the air outlet (15). In this configuration air flows downwards and upwards through the same opening (14,15) resulting in six opposing air pathways.

Figure 5:
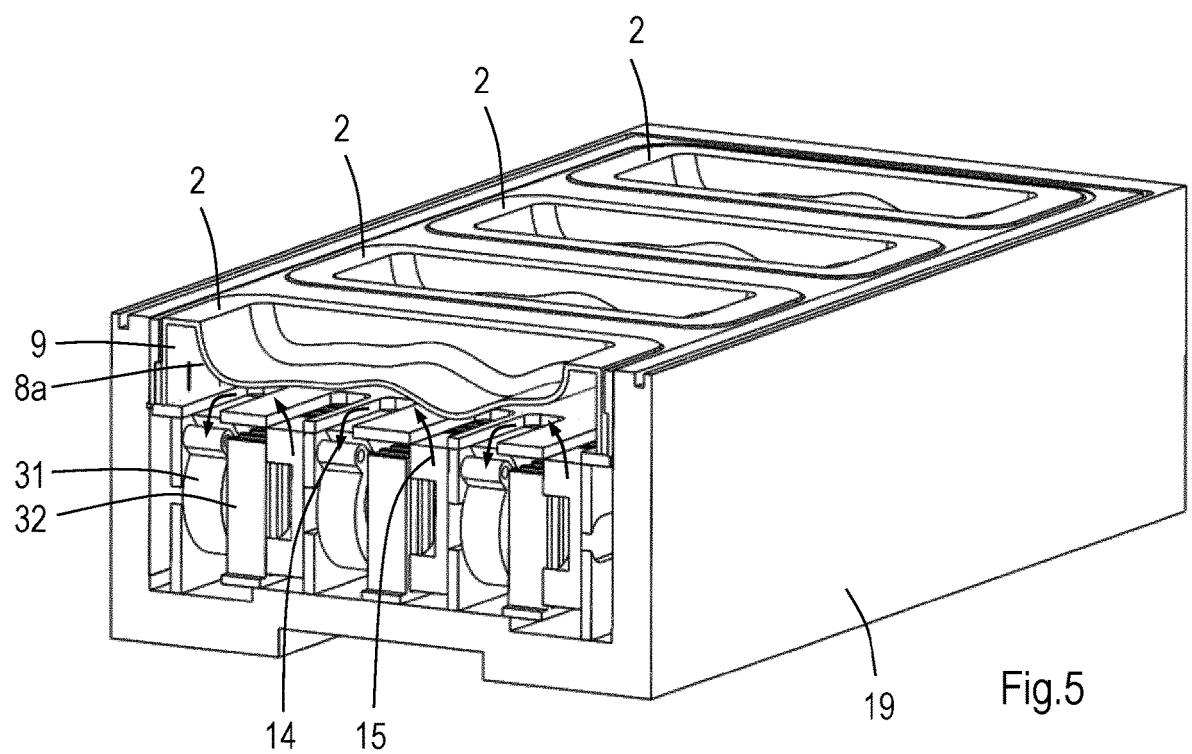

FIG. 5 shows a cross sectional view of the assembled container (19) of FIG. 3. An air flow is illustrated from the open spaces (9), the openings (10) in the bottom (5) of the mould (2), the centrifugal fan (31), the metal fins (32) and back via air outlet opening (15) to open space (9). This cool air flow will cool the lower surface (8a) of the recess wall (8).

Figure 6:
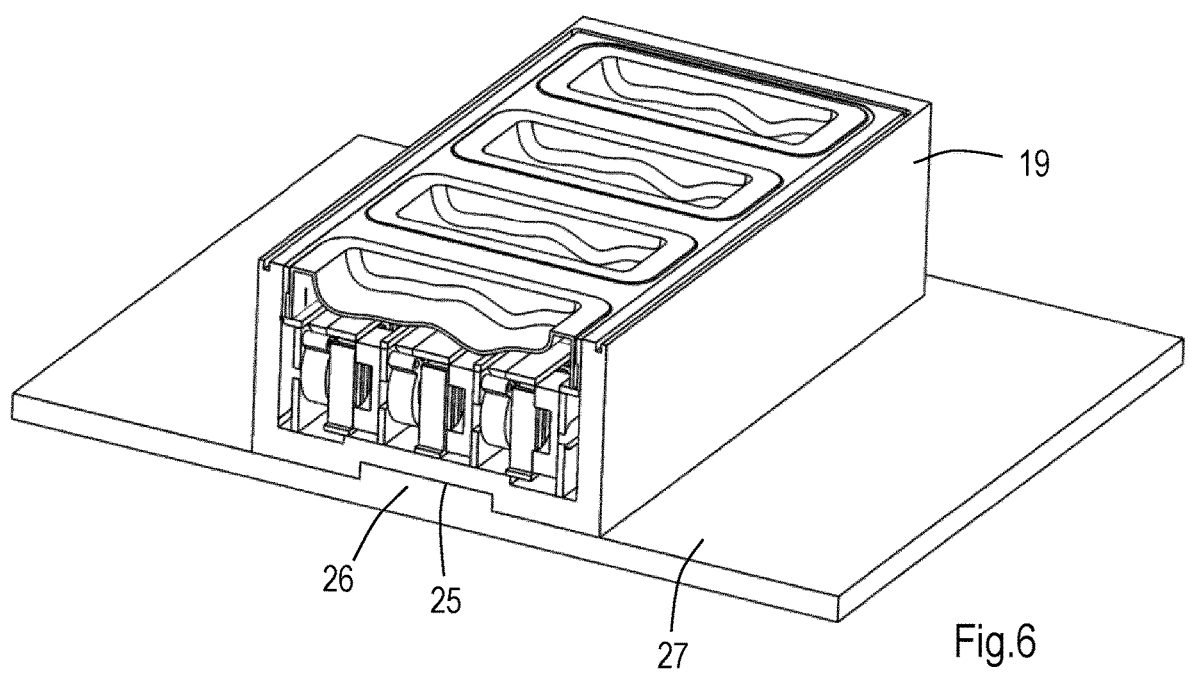

FIG. 6 shows the assembled container of FIG. 5 as placed on a on a rail (26) of a on a cooled support plate (27) of a thermoforming forming station. The assembled container may also be used in isolation, ie without a thermoforming forming station. This may be advantageous when relatively warm moulds are removed from the thermoforming forming station. By maintaining the air flow the moulds may be further cooled while being disassembled from the thermoforming forming station.

The invention claimed is:

1. A mould configuration for forming one or more thermoformed objects, the mould configuration comprising:
   one or more moulds made from a polymer material by additive manufacturing and provided with an upper end, side walls, and a bottom which is spaced apart from the upper end defining a mould volume having an upper zone and a lower zone, wherein the mould volume consists of a shaped recess having a recess wall corresponding with the shape of the object and having a thickness of between 0.5 and 5 mm, wherein the upper zone extends above the recess wall, and wherein the lower zone extends below the upper zone and is divided from the upper zone by the recess wall, wherein the lower zone is provided with one or more open spaces which fluidly connect the lower surface of the recess wall with one or more openings in the bottom of the mould; and
   a heat exchanger module facing the bottom of the one or more moulds comprising cooling means and one or more cooling gas displacement means and cooling medium inlet openings and cooling medium outlet openings, wherein the cooling medium inlet openings and the cooling medium outlet openings are in fluid communication with the one or more openings in the bottom of the mould;
   wherein the one or more moulds are positioned above the heat exchange module within a single container, wherein the container has a metal bottom, side walls and an open upper end such that the recess of the mould is accessible from above;
   wherein the one or more moulds can be removed; and
   wherein the mould is removably placed in a mould holder suited to hold one or more moulds and wherein the mould holder and the one or more moulds are positioned on top of the heat exchange module within the container thereby fixating the moulds relative to the heat exchange module.

2. A mould configuration according to claim 1, wherein the open spaces, the openings in the bottom of the mould, the cooling medium inlet openings and cooling medium outlet openings of the heat exchange module, the cooling means and the one or more cooling medium displacement means are part of one or more cooling medium flow paths for an cooling medium flow wherein, in use, the cooling medium flow cools the lower surface of the recess wall.

3. A mould configuration according to claim 2, wherein the cooling means are metal fins as present in the one or more cooling medium flow paths are directly connected to a metal surface and wherein in use the fins are reduced in temperature by thermal conduction between the relatively warmer metal fins and a colder metal surface.

4. A mould configuration according to claim 1, wherein the gas displacement means are ventilators.

5. A mould configuration according to claim 1, wherein the gas medium displacement means are centrifugal fans.

6. A mould configuration according to claim 3, wherein the heat exchange module is comprised of a set of more than one cooling medium displacement means and metal fins positioned relative to the cooling medium inlet and cooling medium outlet openings such to create in use multiple opposing cooling medium flows which set is dimensioned to cool one mould.

7. A mould configuration according to claim 6, wherein the cooling medium displacement means are centrifugal fans having a cooling medium outlet directed upwards towards a row of cooling medium outlet openings.

8. A mould configuration according to claim 1, wherein one heat exchange module is fluidly connected to the lower end of more than one moulds.

* * * * *